United States Patent
Xie et al.

(10) Patent No.: US 9,516,034 B2
(45) Date of Patent: *Dec. 6, 2016

(54) INHERITANCE BASED NETWORK MANAGEMENT

(71) Applicant: Fortinet, Inc., Sunnyvale, CA (US)

(72) Inventors: Michael Xie, Palo Alto, CA (US); Langtain Du, Fremont, CA (US); Jun Li, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/670,323

(22) Filed: Mar. 26, 2015

(65) Prior Publication Data

US 2015/0207693 A1 Jul. 23, 2015

Related U.S. Application Data

(63) Continuation of application No. 11/084,071, filed on Mar. 16, 2005, now Pat. No. 9,137,251.

(51) Int. Cl.
*H04L 29/06* (2006.01)
*H04L 12/24* (2006.01)

(52) U.S. Cl.
CPC ......... *H04L 63/102* (2013.01); *H04L 41/0816* (2013.01); *H04L 41/22* (2013.01); *H04L 63/104* (2013.01)

(58) Field of Classification Search
CPC .. H04L 63/102; H04L 63/104; H04L 41/0816; H04L 41/22
USPC .............................. 726/1, 2, 3; 709/223, 229
See application file for complete search history.

(56) References Cited

U.S. PATENT DOCUMENTS

| | | | |
|---|---|---|---|
| 6,678,827 B1 | 1/2004 | Rothermel et al. | |
| 7,359,393 B1 | 4/2008 | Nalawade et al. | |
| 9,137,251 B2 | 9/2015 | Xie et al. | |
| 9,253,034 B1 * | 2/2016 | Krishnamurthy ... | H04L 41/0843 |
| 2002/0169954 A1 | 11/2002 | Bandini et al. | |
| 2003/0023587 A1 | 1/2003 | Dennis et al. | |
| 2003/0110397 A1 | 6/2003 | Supramaniam et al. | |
| 2004/0215650 A1 | 10/2004 | Shaji et al. | |
| 2006/0005185 A1 | 1/2006 | Nguyen | |

(Continued)

OTHER PUBLICATIONS

Examiner's Answer to Appeal Brief for U.S. Appl. No. 11/084,071 mailed Nov. 28, 2011.

*Primary Examiner* — Sarah Su
(74) *Attorney, Agent, or Firm* — Hamilton, DeSanctis & Cha LLP

(57) ABSTRACT

Systems and methods for normalization of physical interfaces having different physical attributes are provided. According to one embodiment, information regarding multiple network devices is presented to a network manager. The network devices have substantially identical function. Two physical interfaces of two network devices that are to be normalized are identified. The physical interfaces are normalized by creating a virtual interface (VI) to which both correspond. A policy applicable to the VI is received. Configuration files, in which policies or rules contained therein are expressed in terms of the VI, are created for the network devices while they are offline. Physical interface configurations for the physical interfaces are resolved during installation of the network devices by resolving references to the VI in the configuration files into the respective physical interfaces.

15 Claims, 12 Drawing Sheets

(56) References Cited

U.S. PATENT DOCUMENTS

2006/0212924 A1 9/2006 Xie et al.
2008/0117917 A1 5/2008 Balay et al.

* cited by examiner

Interface Normalization

| Device Type | v_internal | v_external | v_dmz | v_ha | v_port1 | v_port2 | v_port3 | v_port4 | v_port5 | v_port6 | v_port7 | v_port8 |
|---|---|---|---|---|---|---|---|---|---|---|---|---|
| FortiGate50A | internal | external | dmz | -- | -- | -- | -- | -- | -- | -- | -- | -- |
| FortiGate60 | internal | wan1 | dmz | -- | wan2 | -- | -- | -- | -- | -- | -- | -- |
| FortiWiFi60 | internal | wan1 | dmz | -- | wan2 | wlan | -- | -- | -- | -- | -- | -- |
| FortiGate100 | internal | external | dmz | -- | -- | -- | -- | -- | -- | -- | -- | -- |
| FortiGate200 | internal | external | dmz | -- | -- | -- | -- | -- | -- | -- | -- | -- |
| FortiGate300 | internal | external | dmz/ha | -- | -- | -- | -- | -- | -- | -- | -- | -- |
| FortiGate400 | internal | external | dmz | ha | port1 | port2 | port3 | port4/ha | -- | -- | -- | -- |
| FortiGate500 | internal | external | dmz | ha | port1 | port2 | port3 | port4 | port5 | port6 | port7 | port8 |
| FortiGate800 | internal | external | port1 | port4/ha | port1 | port2 | port3 | port4 | port5 | -- | -- | -- |
| FortiGate1000 | internal | external | port1 | port4/ha | port2 | port3 | port4 | -- | -- | -- | -- | -- |
| FortiGate2000 | internal | external | port1 | port5/ha | port2 | port3 | -- | -- | -- | -- | -- | -- |
| FortiGate3600 | internal | external | port1 | -- | port2 | port3 | -- | -- | -- | -- | -- | -- |

Tag Configuration

Tag Name  TAG_09/24/2004

[Apply]  [Cancel]

Checkout Configuration

Please Select Tag Name

TAG_09/24/2004

[Apply]  [Cancel]

FIG. 13

INHERITANCE BASED NETWORK MANAGEMENT

CROSS-REFERENCE TO RELATED APPLICATIONS

This application is a continuation of U.S. patent application Ser. No. 11/084,071, filed Mar. 16, 2005, now U.S. Pat. No. 9,137,251, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2005-2015, Fortinet, Inc.

BACKGROUND

Field

Embodiments of the present invention generally relate to the field of network management. In particular, various embodiments relate to methodologies for provisioning and managing a network having a large number of network devices.

Description of the Related Art

A computer network or network is a plurality of network devices connected together. At the risk of stating the obvious, the world today depends upon functionality provided by computer networks. This dependence upon networks is growing.

Network devices are the fundamental component of the network, and come in a variety of types and forms including routers, firewalls and Unified Threat Management (UTM) devices. For a network to function properly, the network devices making up the network must be configured properly, regardless of device type, location, or any number of parameters affecting device or network behavior. Substantial resources inevitably go into management of the network devices.

In deploying a corporate computer network, most companies use same or similar type devices to reduce required management resources. Likewise, many of the devices in such a network typically share at least some common policies or rules. For example, company wide network policies control access to certain websites or types of websites, provide or define specific attack avoidance mechanisms, and define mechanisms for detecting email spam. Within the company wide network, certain subsets of devices may also share common policies. At an even finer level of granularity, the individual device often has specific and sometimes unique policies, such as their own routing policy or gateway.

Current solutions lack suitable mechanisms for implementing network wide policy configurations applicable to selected sets of devices. This forces the company IT worker to set the policy on each device, regardless of any overlap in policy configuration from device to device. Accordingly, there exists a need for improved mechanisms for managing networks hosting many devices that will enable application of policy configuration across groups of devices.

SUMMARY

Systems and methods are described for the normalization or virtualization of physical interfaces. According to one embodiment, information regarding multiple network devices managed by a network management system is presented to a network manager via a graphical user interface (GUI) of a network management system. The network devices have substantially identical function, are associated with a private computer network and are logically interposed between client systems of the private computer network and an external computer network. Information indicative of a first physical interface of a first network device and a second physical interface of a second network device that are to be normalized is received from the network manager via the GUI. The first physical interface and the second physical interface have different physical attributes. The first physical interface and the second physical interface are normalized by the network management system by creating a virtual interface to which both the first physical interface and the second physical interface correspond. Information regarding a policy applicable to the virtual interface is received from the network manager via the GUI. Responsive to receiving the policy information, a first configuration file is created or modified for the first network device while the first network device is offline and a second configuration file is create or modified for the second network device while the second network device is offline in which one or more policies or rules contained therein are expressed in terms of the virtual interface. Policy configurations are applied to the first and second network devices and physical interface configurations for the first and second physical interfaces are resolved during installation of the first and second network devices by resolving references to the virtual interface in the first configuration file into the first physical interface and resolving references to the virtual interface in the second configuration file into the second physical interface.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 5-6 illustrate the normalization or virtualization of physical interfaces into virtual interfaces in accordance with one embodiment of the present invention.

FIG. 12 illustrates a manual tag interface according to yet another embodiment of the present invention.

FIG. 13 illustrates a retrieve tagged version according to still another embodiment of the present invention.

DETAILED DESCRIPTION

Systems and methods are described for the normalization or virtualization of physical interfaces.

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

Figure 1:
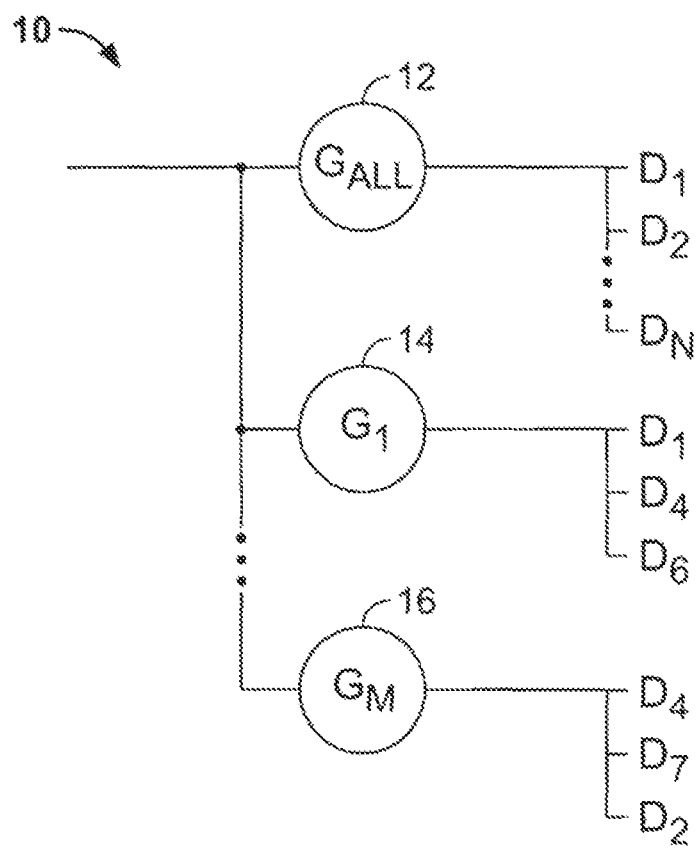
FIGS. 1 and 2 provide abstract illustrations of an inheritance based network management system according to certain embodiments of the present invention.
Figure 2:
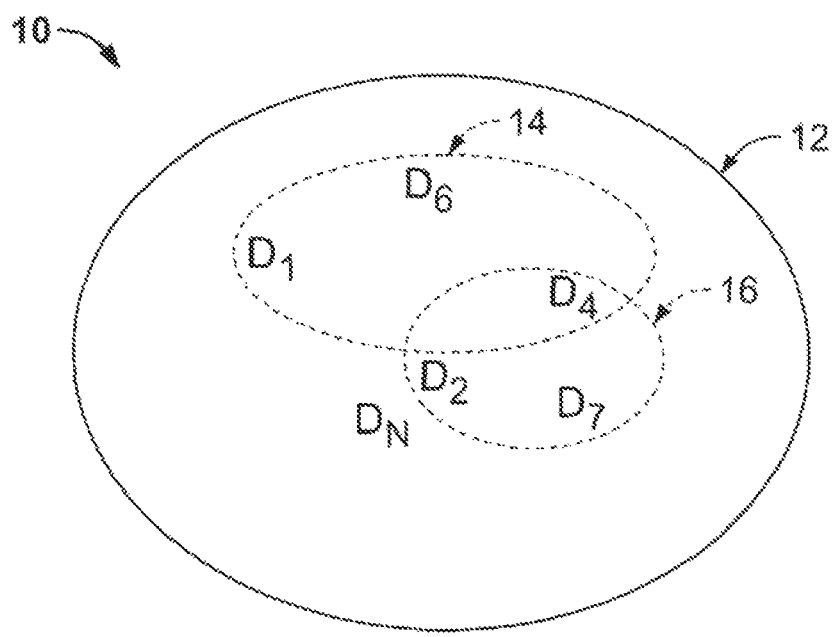

FIGS. 1 and 2 provide abstract illustrations of an inheritance based network management system 10 according to certain embodiments of the present invention. The system 10 is an inheritance based representation of a computer network having N network devices, where N is an integer. The system 10 is organized into a plurality of groups such as groups 12-16. A "group" typically includes a configuration scheme and a set of devices including at least one device. The "all" group 12 includes every network device D1-DN. Two more example groups G1 and GN are also shown in FIGS. 1 and 2. A network device may belong to more than one group.

As will be discussed in more detail below, each group has a set of policies and rules (hereinafter "policies") that may be provided by any suitable mechanism. For example, a specific group may have a configuration file that defines the policies applicable to the specific group. According to embodiments, each given device inherits the policies of each group to which the given device belongs. As described in more detail below, when a device belongs to more than one group and policy inconsistencies arise, well-defined priority rules determine which policy the device takes on.

Each group may be a well defined subset of the computer network, and the group policy configuration would be set accordingly. For example, a first group may represent all devices of a certain type that are used for network security purposes such as web filtering, antispam, firewall, gateway, etc. A second group may correspond to a set of network devices responsible for load balancing across all or a portion of the network. A third group may correspond to a set of network devices that are personal desktop computers. A fourth group may correspond to a set of network devices that are wireless devices. A fifth group may correspond to a set of archival devices. A sixth group may correspond to a set of devices located in a specific geographical location. A seventh group may correspond to a set of devices assigned to a certain type of employee. In any event, those skilled in the art will realize that the possible group types are enumerable and the advantages of using an inheritance based methodology crosses over all types of imaginable groups.

Figure 3:
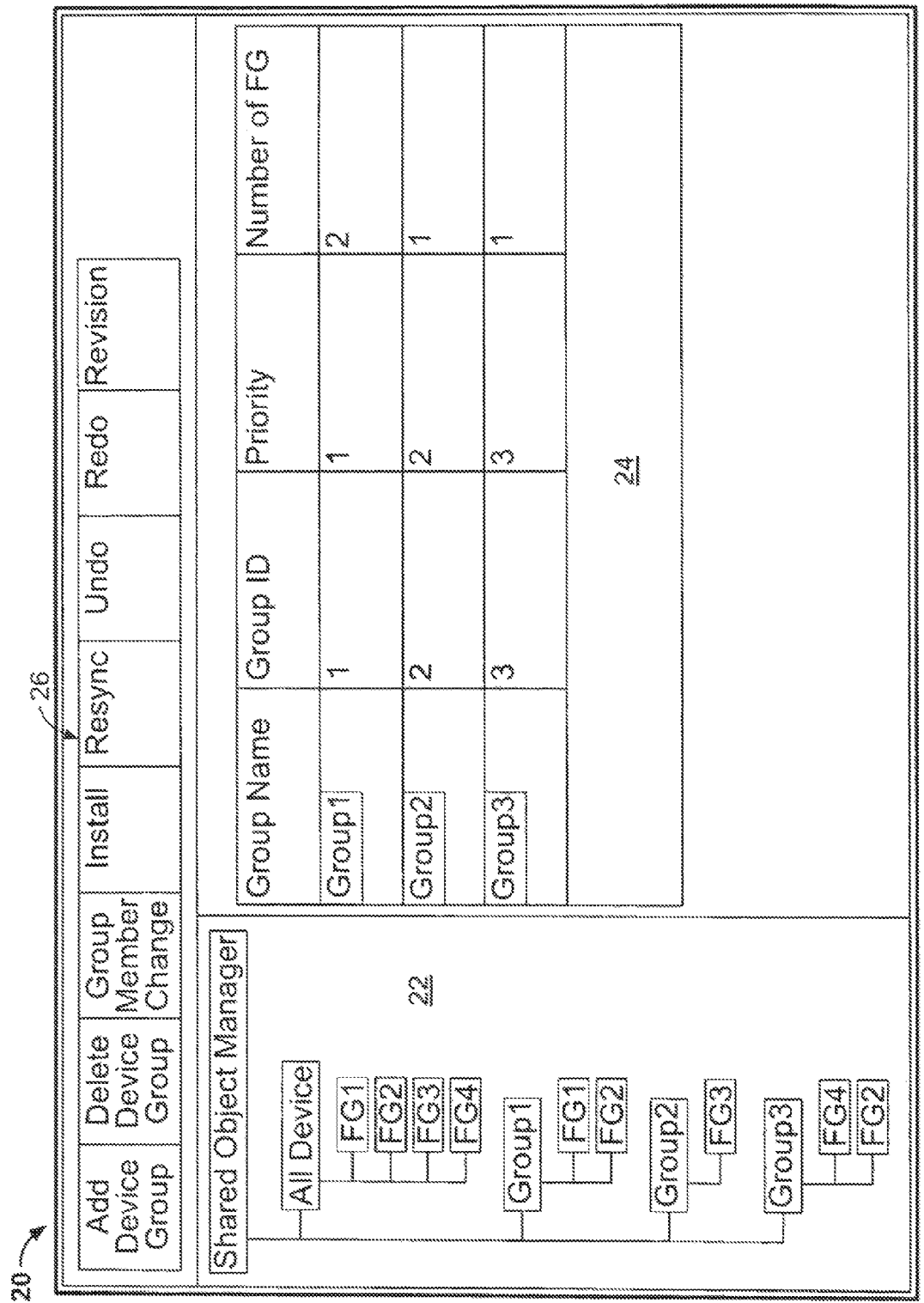
FIG. 3 illustrates an interface according to an embodiment of the present invention.

FIG. 3 illustrates an interface 20 according to an embodiment of the present invention. The interface 20 has a shared object manager window 22, a group data window 24, and a set of control buttons 26. The shared object manager window 22 displays the hierarchical information about the various network groups and network devices. The window 22 provides a graphical representation of information similar to information described above with reference to FIGS. 1-2. The group data window 24 provides information such as group names, group id, priority and device quantity. The set of control buttons 26 provides for common tasks a network manager might desire including add group, delete group, change group membership, install attributes, resynch, undo, redo, and revision. Some of these features are optional and will be described below in more detail with reference to FIG. 4.

Figure 4:
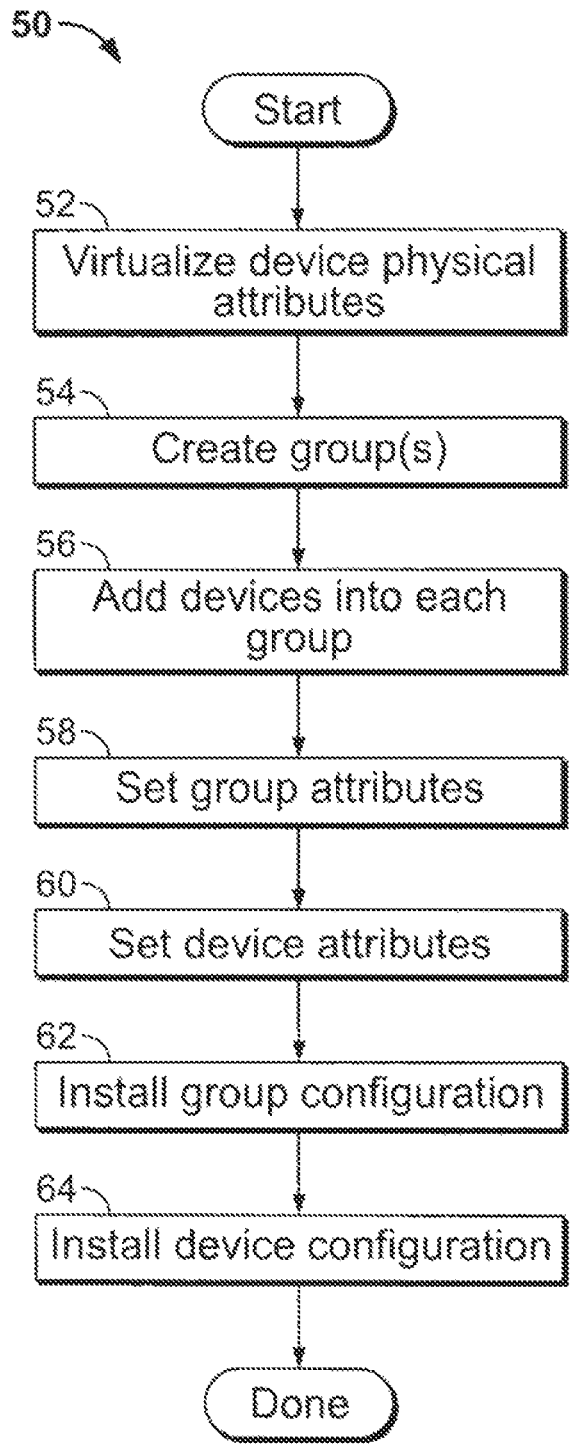
FIG. 4 is a flow chart of an inheritance based network management method 50 according to an aspect of the present invention.

FIG. 4 is a flow chart of an inheritance based network management method 50 according to an aspect of the present invention. The method 50 begins in a "start" step with any initialization and housekeeping functions that must be performed before embarking on managing the groups and devices of the network.

A step 52 virtualizes physical attributes of devices to be managed within the network. As will be appreciated, a network is typically formed of a variety of devices, many of which do not have the same features. This includes different physical attributes. Accordingly, if multiple different type devices are to inherit the same policies from a group, the relevant device differences must be addressed. The present invention teaches virtualization of all physical attributes; i.e., mapping all physical attributes into virtual representations.

Figure 5:
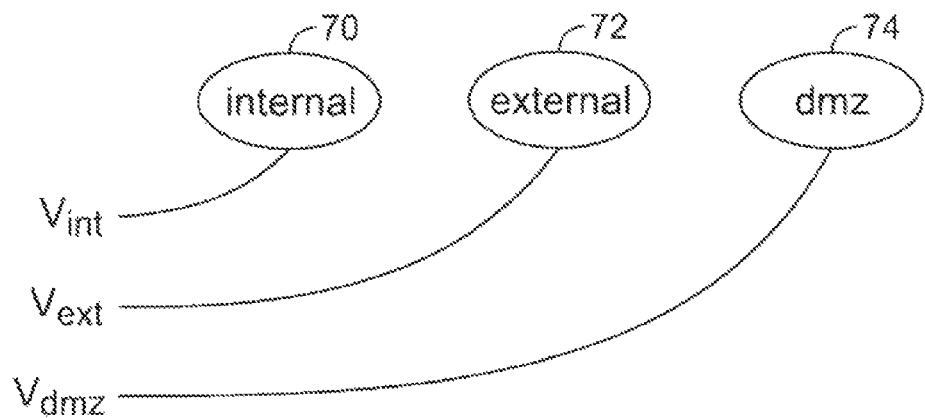

FIGS. 5-6 provide examples showing the normalization or virtualization of physical interfaces into virtual interfaces, as required by step 52 of FIG. 4. This process would be performed for any normalized physical attribute, the interface is provided merely as an example of a common physical attribute. FIG. 5 is an abstract representation of this virtualization, showing an internal port 70 mapped into a virtual port Vint, an external port 72 mapped into a virtual port Vext, and a dmz port 74 mapped into a virtual dmz port Vdmz. FIG. 6 illustrates a normalization interface 80 that allows a network manager to view and control the virtualization of physical interfaces within the system. Device type column 82 shows the different device types for which normalization is performed. The virtual interface 84 provides a matrix showing the mapping from the physical interfaces to the corresponding virtual matrices. Within the configuration file, policies and rules will be implemented in terms of the virtual attributes. Upon installation, all the virtual attributes will be resolved into the corresponding physical attributes for each particular device.

The present invention also contemplates method embodiments wherein the normalization step 52 is limited or not used at all. In such methods, further rules of operation will be in place. For example, the method could require that only identical type devices and/or devices with identical physical attributes are allowed in a group. Alternatively, the group configuration files could be restricted from referencing physical attributes altogether, requiring each device to self-define policies and rules for physical attributes. In another embodiment, the normalization may apply only to certain physical attributes, and restrictions must be applied accordingly.

With further reference to FIG. 4, a step 54 creates each group, a step 56 adds devices into each group, a step 58 sets group attributes, and a step 60 sets device attributes. As will be appreciated, these steps 54-60 are the steps that create the group and device hierarchies, and establish group and device configurations, group priorities, and any other actions which define the system.

The particular order in which steps 54-60 are performed depends upon the nature of the network and the particular operation being performed. A network manager may initially have a known set of devices, as well as various configurations known to work well. This configuration could be created offline.

Alternatively, the network manager could be installing just a single device into an already operating system. Again, the device configuration will be set offline and then only once installation is initiated will the configuration be set.

The present invention also contemplates a variety of mechanisms whereby the network manager can establish the configuration files. For example, a device template can be created having a configuration desired to be applied to the group. The device template is then added to the group and a reverse inheritance procedure promotes the policies and rules found in the device template. All the devices in the group will then inherit these desired policies and rules.

As described above, the present invention contemplates an embodiment wherein all the devices are managed in an offline state. After a device is added into the system, the device's new configuration will not be pushed into the device until an installation is required by a user. Before installation, all the changes are done offline and only in the database or memory. The real time monitor is the key component to make sure third party will not touch the configuration in the device. And since it is in the offline-working environment, the version control system can always allow user to go back at any tag he made before. It also includes multiple redo or undo actions.

By inheriting the necessary policies from group level, the common policies need only be set once. This reduces effort in effectuating the change, as well as minimizing error, and making errors easier to find. Similar to setting common group policies, the device only policies must be set so that each device has all necessary rules and policies to govern its behavior.

Figure 7:
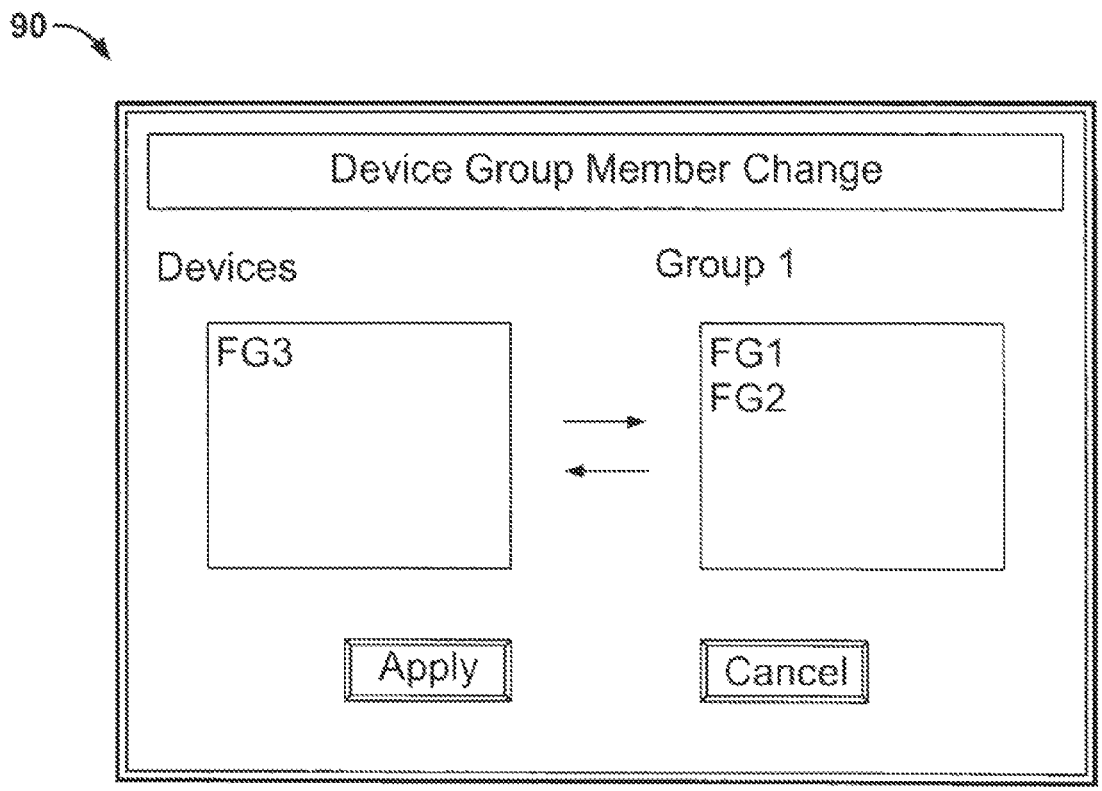
FIG. 7 illustrates a device group member change interface according to yet another embodiment of the present invention.

FIG. 7 illustrates a device group member change interface 90. The interface 90 is one suitable mechanism for providing the add devices step 56 of the method 50 FIG. 4. The interface 90 displays for a selected group the devices found in the selected group, and the devices available to add to the selected group.

Figure 8:
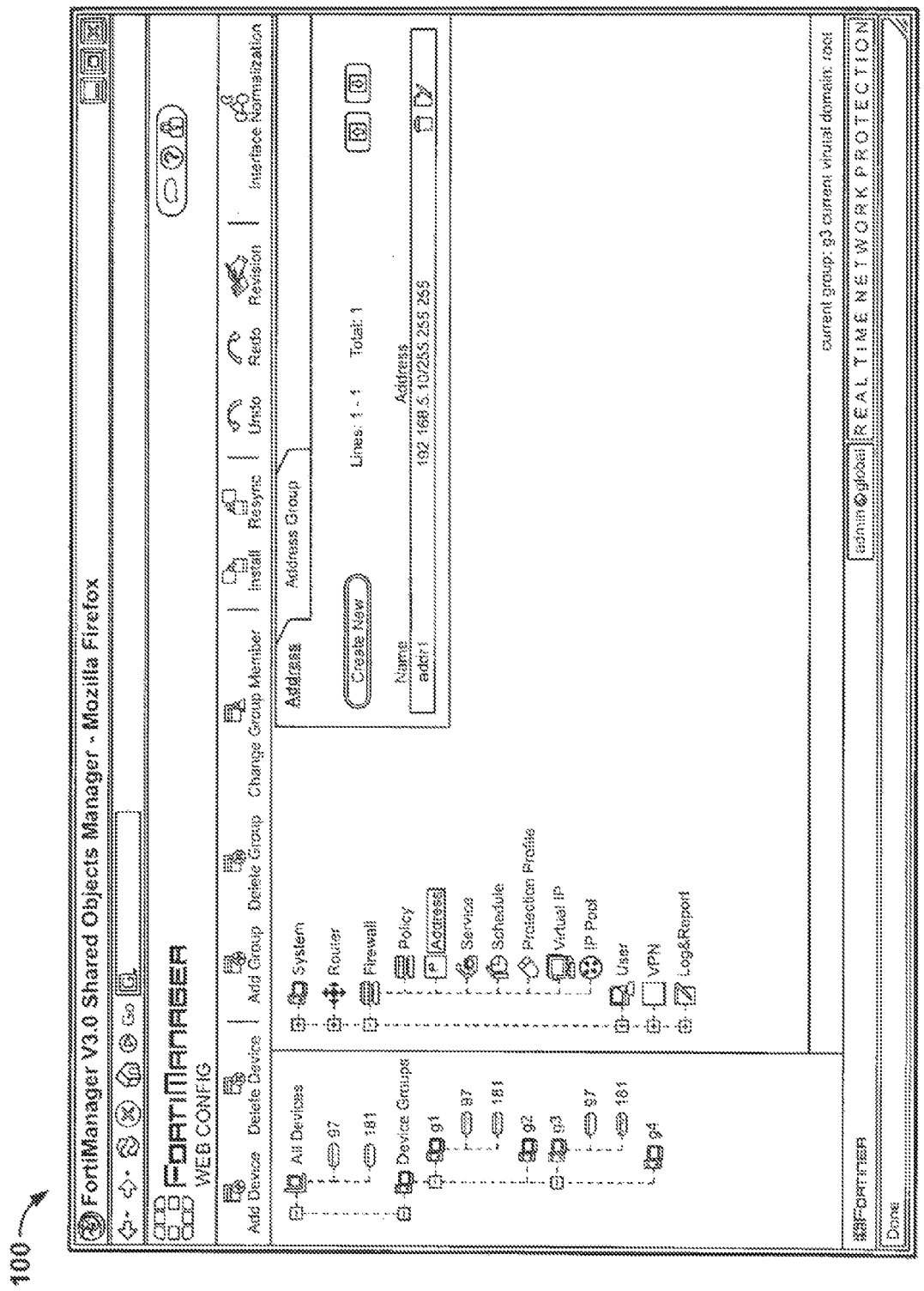
FIG. 8 illustrates a group configuration interface in accordance with another embodiment of the present invention.

FIG. 8 illustrates a group configuration interface 100. The group configuration interface 100 provides one possible mechanism for a network manager to define the policies and rules applicable to a selected group. FIG. 8 specifically illustrates setting an IP address as part of the selected group's policies.

As a device may be a member of more than one group, situations may arise where there are conflicting policies to be inherited by the device. Accordingly, predefined rules of priority must be in place. A very useful and simple priority scheme is to simply set the priority of the groups the same as the sequence of groups. For example, G1 would have priority over G2 which would have priority over G3, and so on. Gall could either be the lowest or highest priority.

Other priority rules can be defined. For example, a device may have a self-defined policy the conflicts with a policy of a group to which the device belongs. In this case, either the device or the group must take priority. Typically, the device would be defined as taking priority. Another rule is when the device has the same name policy, the one on the device always has the highest priority.

In practice, the method may use a device as a template to set up many other devices. So we need to promote the policy from device level to group level, then the promoted policies will be applied to all the devices in the group through inheritance.

The GUI interfaces should display real time results. This is called "what you see is what you get." The system 10 must resolve any conflicts and display the result that will be used to push into the device upon installation.

Turning to the final steps of method 50 of FIG. 4, steps 62 and 64 correspond to the installation of a device or devices into the network. As described above, the configuring of the network devices, through group and device configuration, is all performed offline. This is advantageous as the network can continue operating in a known state and without interruption until the user requires installation of the network device. The installation is a procedure of calculation performed at the request of the user. Installation calculates the configuration for each device based on all the groups' configuration and device configuration. Rules of priority, such as the two rules mentioned above, are used to resolve any configuration conflict. The new calculated configuration information is then pushed into device.

Because each device is added into the system in real time, the system is guaranteed at that installation to have the correct configuration information.

However, subsequent to the initial installation, it is possible that the device configuration could be changed, perhaps by a third party, invalidating the configuration information inside the system. In certain embodiments, a real time monitor is added to make sure the device is not changed after it is added into the management system.

Figure 9:
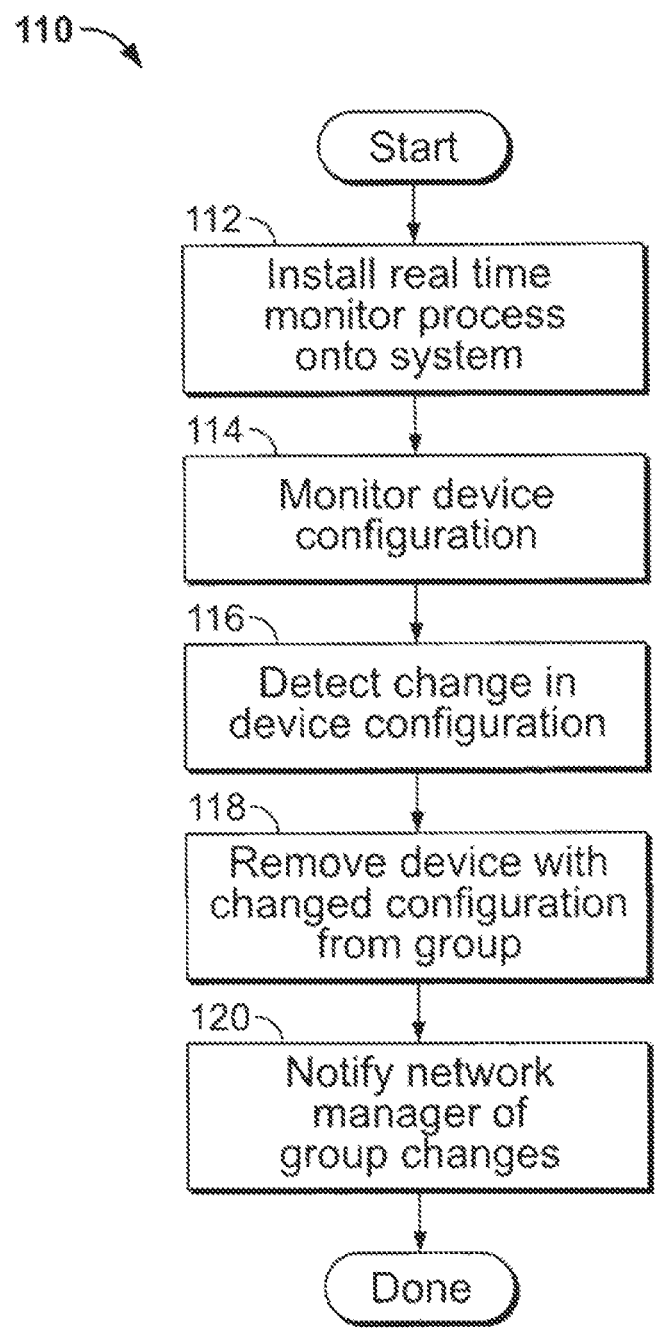
FIG. 9 illustrates a flow chart for a real time monitor method according to still another aspect of the present invention.

FIG. 9 illustrates a flow chart for a real time monitor method 110 according to yet another aspect of the present invention. A step 112 installs a real time monitor process onto the system. Once installed, in a step 114 the real time monitor watches device configuration to determine whether any changes are made. This monitoring process 114 continues indefinitely and in parallel with other operations. At some point, a step 116 may detect a change in device configuration that was not effectuated by the system. As a result of the configuration change, there may be an inconsistency between a device and a group to which the device belongs. The real time monitor determines which, if any, groups the new device configuration is inconsistent with, taking into consideration any rules such as priority used in calculating configuration. In a step 118, the real time monitor removes the device from any groups for which the changed configuration is inconsistent. A step 120 notifies the user of the change and allows the user to update or reinstall the device as desired.

Certain embodiments teach mechanisms for providing version control. Closely associated with version control are redo and undo features. As will be appreciated, the network management systems described above will be used to manage networks having hundreds or thousands of devices. Given the large scale of modern networks, any number of problems can arise. Often these problems arise due to configuration problems. The configuration problems might arise when new devices are installed into the network, configuration updates are made manually or through other mechanisms, etc. One approach to begin solving such problems is to take a snapshot of the system state (configuration in particular) at different stages of operation. For example, the network manager may have a particular system configuration that has worked well over a period of time and in a variety of different situations. Accordingly, a snapshot of this configuration may be manually or automatically preserved.

Figure 10:
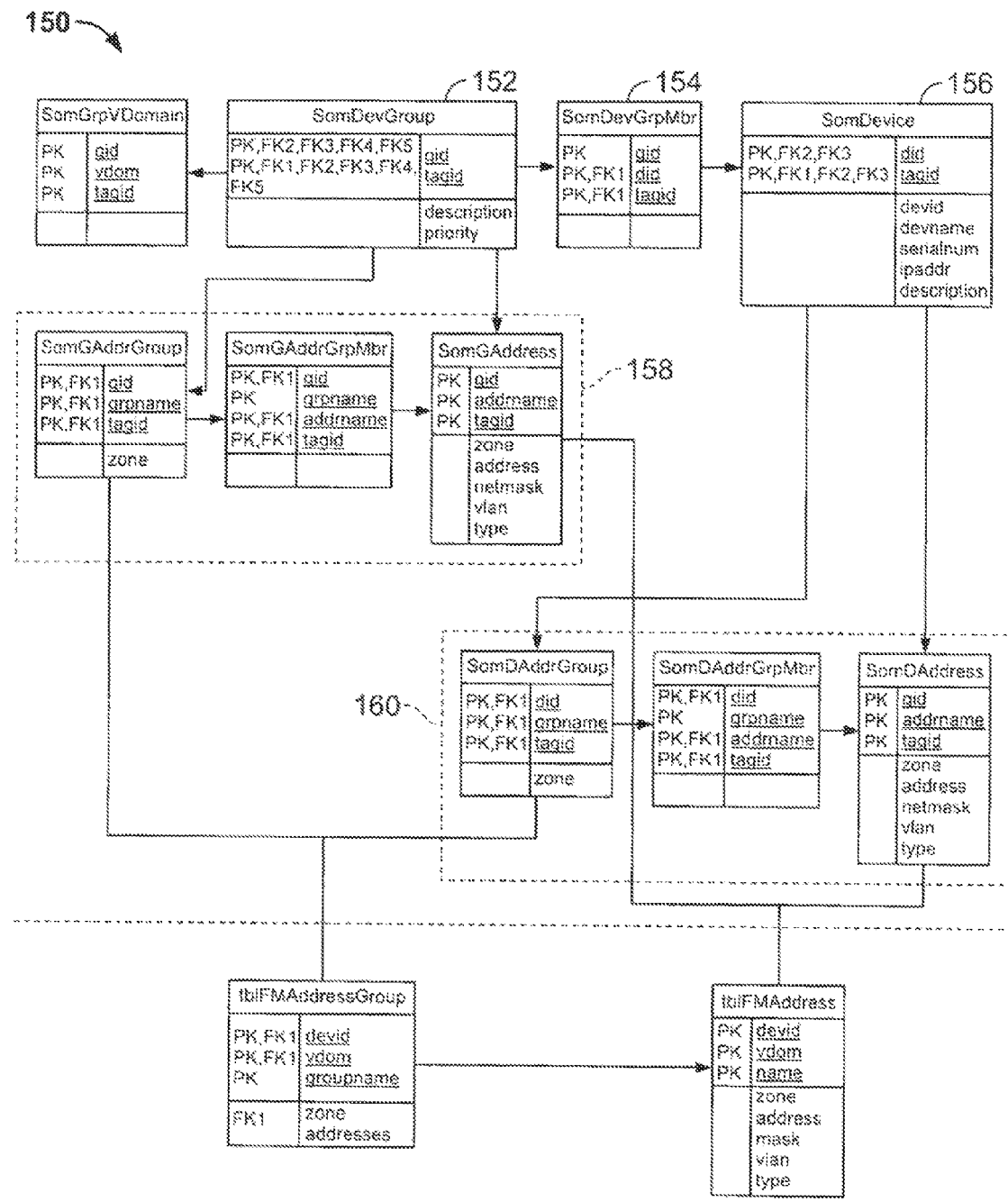
FIG. 10 illustrates a shared object manager (SOM) data structure of the invention.
Figure 11:
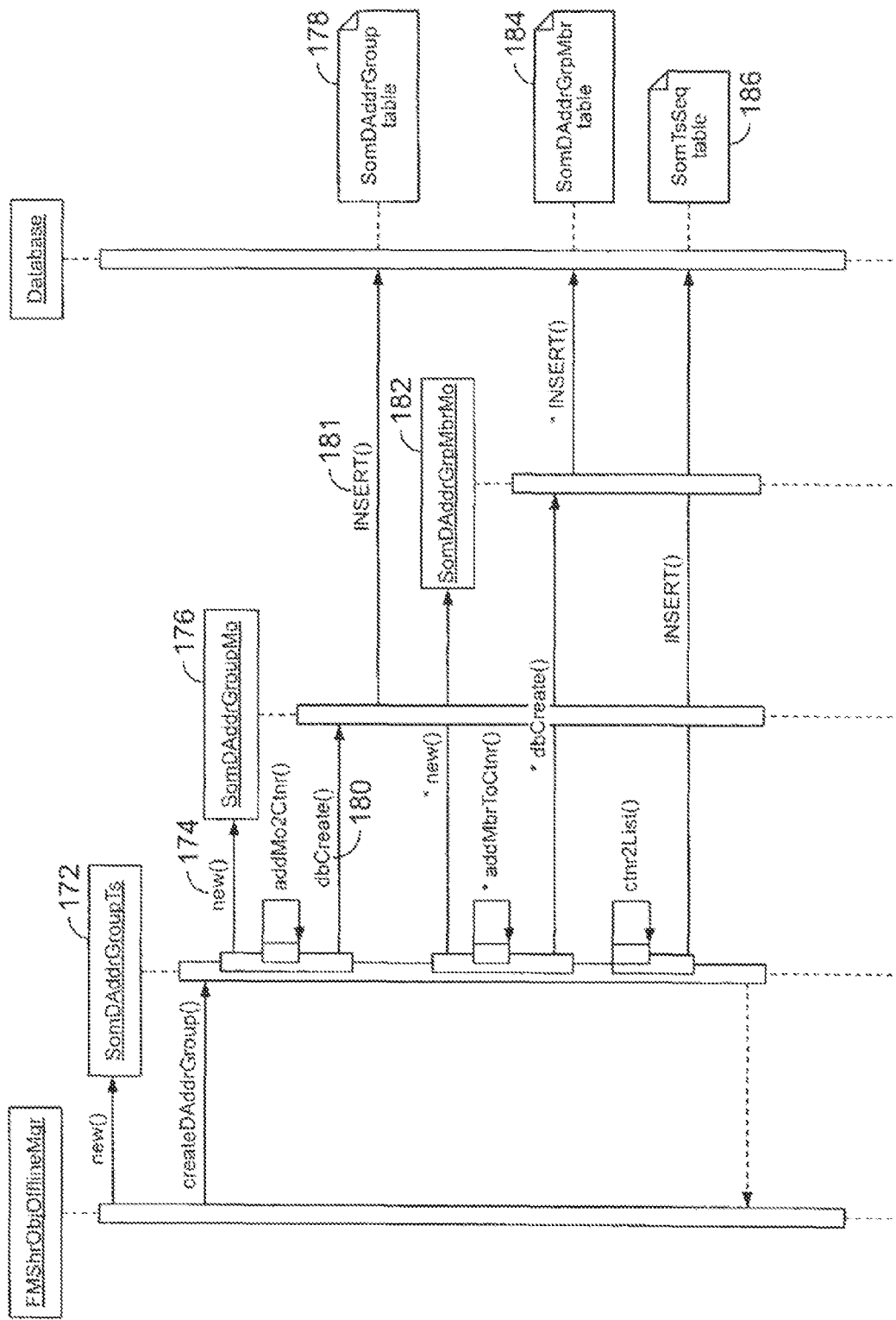
FIG. 11 illustrates flow control of a redo/undo process according to one aspect of the present invention.

FIG. 10 illustrates a shared object manager (SOM) data structure 150 that is an example of one SOM data structure that may result from an SOM embodiment used to provide version maintenance. FIG. 11 illustrates flow control of a redo/undo process. The data structure and associated processes will be explained by way of example.

"Address" and "AddressGroup" referenced in FIG. 11 or below are two policies that must be configured into devices. As described above, there may be group level policies and device level policies, and the appropriate policies must be selected based on any defined rules of priority. One "AddressGroup" policy may include a few "Address" policies.

In each of the SOM database tables shown in FIG. 10, there is a tagid field used to support a revision feature. The row in a table as a part of the current configuration will always have a constant tagid value (e.g., "1"), whereas a tagged version will assume an integer value over a designated range excluding the constant value (e.g., "0" and "2" to "65,535"). The tagid field will be described below in more detail.

At the basis of the SOM data model, we have device groups and their member devices. Devices added/resynchronized to SOM are stored in the SomDevice table 156, whereas device groups added by the user are kept in the SomDevGroup table 152, in which field priority decides which object (e.g., an Address) in the device group takes precedence over the objects with identical names (e.g., Addresses with the same addrname value) that are associated with a particular device. A device may be included in one or more device groups, with its members collected in the SomDevGrpMbr table 154. Upon a device being added to a device group, a new row will be created in table SomDevGrpMbr 154. FIG. 10 also shows the Address and Address Group at a group level 158 and a device level 160.

To support a revision feature, one more table is needed, SomRevision, as shown below.

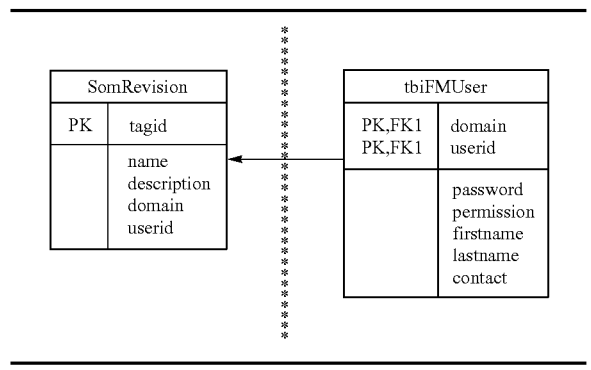

When the user saves or tags the current revision (See interface 200 of FIG. 12), the system will create a new entry in the table SomRevision shown above. Field tagid will be assigned a unique value different from the constant used to exclusively identify the current version, while other fields will be either provided by the user (e.g., the name) or available already in the server (e.g., the userid). Then the current version data in every SOM table is duplicated having the newly minted tagid.

In the reverse direction (See interface 210 of FIG. 13), when a tagged version is retrieved, the system will first clear out all current configuration data (e.g., the current version), and then duplicate the data in every table to entries with the constant tagid.

Multiple redo and undo actions are implemented a little bit differently from the version control system. When an operation involves modification of data, the system can package and save all of them somewhere For example, the system may package and save the data as a BLOB in a database record. An identifier such as a sequence number (likely the primary key) can be used to move back and forth according to the undo and redo requests. The data for each transaction will be packaged in a list (or queue or vector) of varying structures, each of which holds an "atomic" operation to an individual table TOW.

In an "undo" operation, the rollback must be done in the reverse order of its original "do" operation. To do this, the system may extract operations, each of which contain data for managed objects, from the saved list of structures. By iterating through the list of structures in the reverse order, the system performs the reverse operation (e.g., delete) using the originally recorded data (e.g., add).

Data List Header:

| total size (TS) | ops count (OC) | data offset (DO) |
|---|---|---|
| 4 bytes | 4 bytes | 4 bytes |

Operation Index:

| op type (OT) | MO type (MT) | data size (DS) | data count (DC) | data offset (DO) |
|---|---|---|---|---|
| 1 byte | 4 bytes | 4 bytes | 4 bytes | 4 bytes |

Operation Data:

| data (D) | ... |
|---|---|
| DS/DC bytes | ... |

The packaged data list may be structured as a header plus an array of operation indices, followed by a list of operation data blocks of varying sizes. The total size is equal to the size of the BLOB. The ops count field tells how many elements there are in the array of operation indices. The data offset in the header points to the very first data block immediately after the operation index array.

The op type may assume of the three possible values:
Add
Modify
Delete

The MO type field records the type of managed object under operation. The data size is the total size of the data associated with the operation, while the data count is the number of objects under operation. In the case of a modify operation, the system may have to store both the data before and after the change, in order to easily perform an "undo" operation. The old and new data may be stored side by side as a pair in the data list.

We have until now described the structures for the saved data. Internally, a transaction object in the server keeps the list of operations in a container consisting of managed objects, and converts between this representation and the aforementioned data list.

With reference now to FIG. 11, we will now describe, a procedure to support redo and undo in the system. A transaction object (say named as SomDAddrGroupTs) 172 encapsulates operations such as create, set, and delete.

The create operation begins when a step 174 creates a SomDAddrGroupMo 176 using data carried in the DAddrGroupData structure. The create operation then verifies that the SomDAddrGroupMo 176 does not already exist in a SomDAddrGroup database table 178. A step 180 adds a create operation with the managed object to the internal operations container and inserts 181 a row into the SomDAddrGroup table 178. Then for each addrname in the StringSeq, the create operation verifies it exists in the SomDAddress table, creates a SomDAddrGrpMbrMo 182, appends a create operation with the managed object to the operations container, inserts the row into the SomDAddrGrpMbr table 184, converts the content in the operations container to a BLOB structured as a data list outlined in the previous subsection, and finally inserts the row into the transaction sequence table 186, in which, e.g., 1000 rows are allowed for each user.

In the midst of the above steps, if a failure occurs, the system must roll back the changes made till that particular point, to ensure integrity of the transaction.

Figure 14:
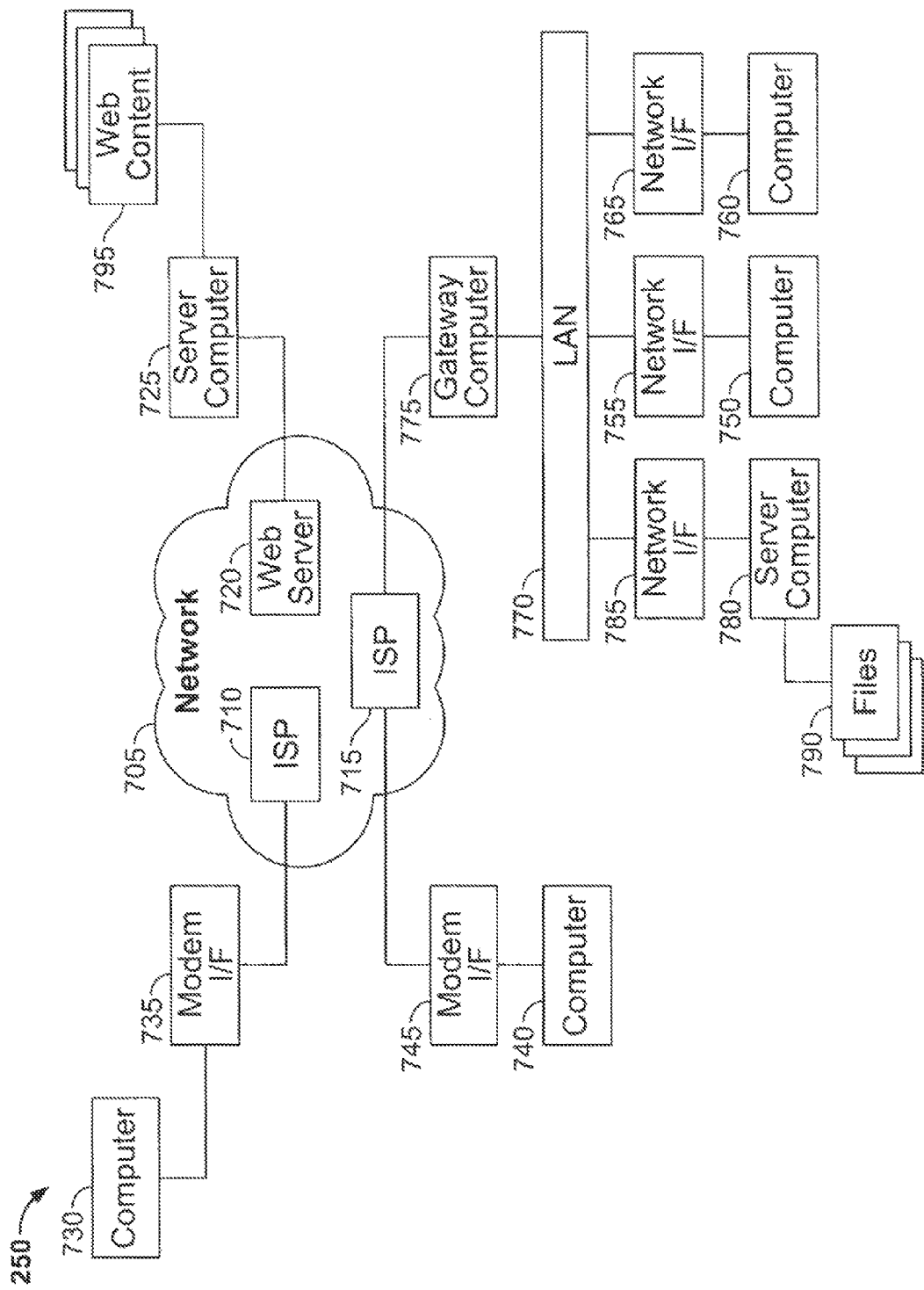
FIG. 14 illustrates an embodiment of a computer network according to one aspect of the present invention.
Figure 15:
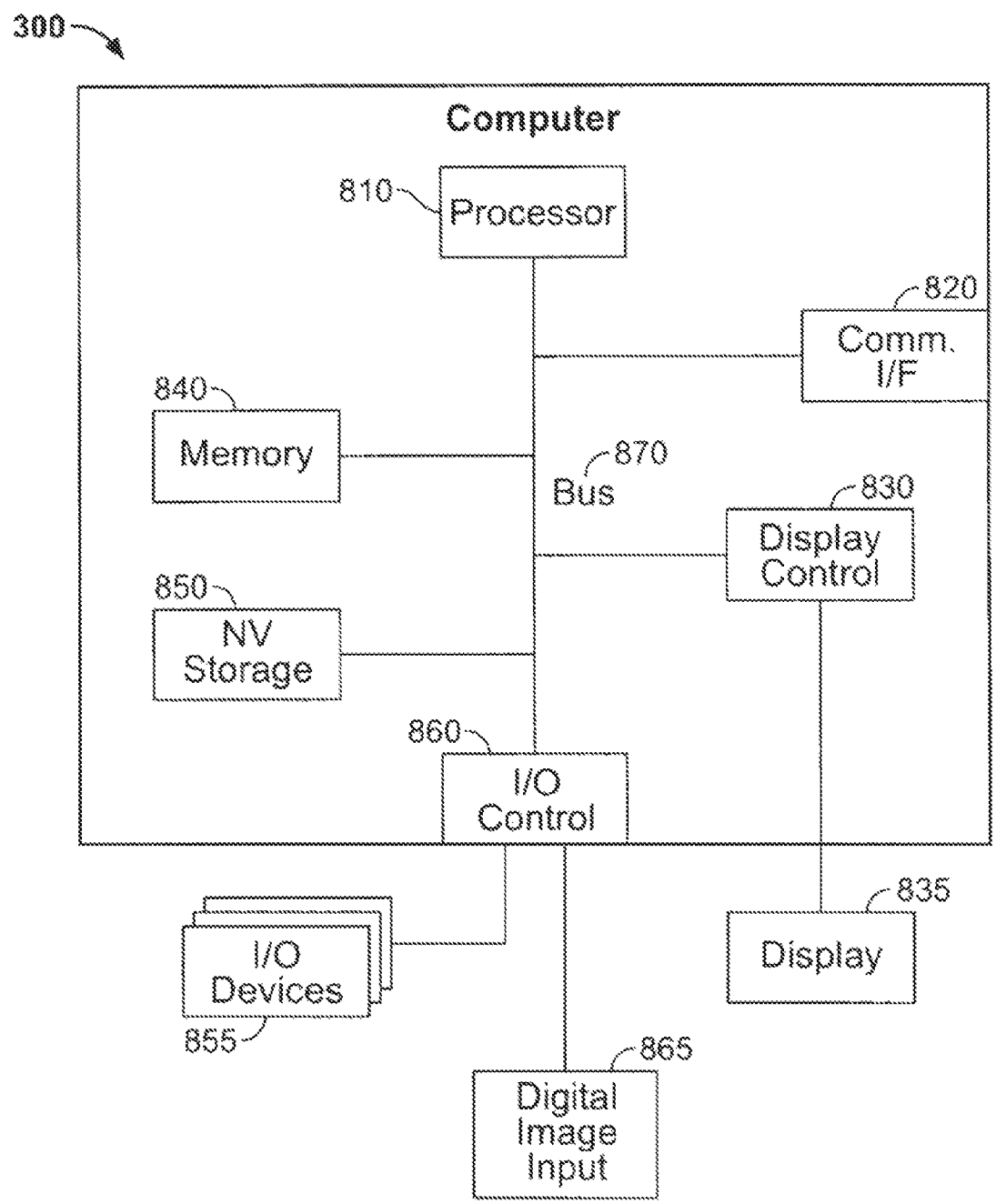
FIG. 15 illustrates a computer system according to another aspect of the present invention.

The following description of FIGS. 14-15 is intended to provide an overview of computer hardware and other operating components suitable for performing the methods of the invention described above and hereafter, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 14 illustrates an embodiment of a computer network 250 having a plurality of network devices, some of which are computer systems. The different network devices illustrated in FIG. 14 may be members of one or more groups as described above with reference to FIGS. 1-13. FIG. 14 shows several computer systems that are coupled together through a network 705, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the Internet and the protocols and communication procedures of the Internet are well known to those of skill in the art.

Access to the Internet 705 is typically provided by Internet service providers (ISP), such as the ISPs 710 and 715. Users on client systems, such as client computer systems 730, 740, 750, and 760 obtain access to the Internet through the Internet service providers, such as ISPs 710 and 715. Access to the Internet allows users of the client computer systems to exchange information, receive and send e-mails, and view documents, such as documents which have been prepared in the HTML format. These documents are often provided by web servers, such as web server 720 which is considered to be "on" the Internet. Often these web servers are provided by the ISPs, such as ISP 710, although a computer system can be set up and connected to the Internet without that system also being an ISP. As will be appreciated, the systems of the present invention can be implemented on a web server, or distributed across the network 705 or the larger network 250.

The web server 720 is typically at least one computer system which operates as a server computer system and is configured to operate with the protocols of the world wide web and is coupled to the Internet. Optionally, the web server 720 can be part of an ISP which provides access to the Internet for client systems. The web server 720 is shown coupled to the server computer system 725 which itself is coupled to web content 795, which can be considered a form of a media database. While two computer systems 720 and 725 are shown in FIG. 14, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides Internet connectivity to the client computer system 730 through the modem interface 735 which can be considered part of the client computer system 730. The client computer system can be a personal computer system, a network computer, a web tv system, or other such computer system.

The ISP 715 provides Internet connectivity for client systems 740, 750, and 760, although as shown in FIG. 14, the connections are not the same for these three computer systems. Client computer system 740 is coupled through a modem interface 745 while client computer systems 750 and 760 are part of a LAN. While FIG. 14 shows the interfaces 735 and 745 as generically as a "modem," each of these interfaces can be an analog modem, isdn modem, cable modem, satellite transmission interface (e.g. "direct PC"), or other interfaces for coupling a computer system to other computer systems.

Client computer systems 750 and 760 are coupled to a LAN 770 through network interfaces 755 and 765, which can be ethernet network or other network interfaces. The LAN 770 is also coupled to a gateway computer system 775 which can provide firewall and other Internet related services for the local area network. This gateway computer system 775 is coupled to the ISP 715 to provide Internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the Internet through the gateway system 775.

FIG. 15 illustrates an embodiment of a computer or machine 300 which may be used in implementing certain embodiments of the present invention. The machine 300 may be a network device, and may be a system for implementing all or a portion of the methodologies disclosed herein. FIG. 15 shows one example of a conventional computer system that can be used as a client computer system or a server computer system or as a web server system. Such a computer system can be used to perform many of the functions of an Internet service provider, such as ISP 710. The computer system 300 interfaces to external systems through the modem or network interface 820. It will be appreciated that the modem or network interface 820 can be considered to be part of the computer system 300. This interface 820 can be an analog modem, isdn modem, cable modem, token ring interface, satellite transmission interface (e.g. "direct PC"), or other interfaces for coupling a computer system to other computer systems.

The computer system 300 includes a processor 810, which can be a conventional microprocessor such as an Intel Pentium microprocessor or Motorola power PC microprocessor. Memory 840 is coupled to the processor 810 by a bus 870. Memory 840 can be dynamic random access memory (DRAM) and can also include static ram (SRAM). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an i/o controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 300. One of skill in the art will immediately recognize that the terms "machine-readable medium" or "computer-readable medium" includes any type of storage device that is accessible by the processor 810 and also encompasses a carrier wave that encodes a data signal.

The computer system 300 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols. Network computers are just one other type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 15, such as certain input or output devices. A typical computer system will usually include at least a processor, memory, and a bus coupling the memory to the processor. The network device envisioned by the present invention however may take any suitable form.

In addition, the computer system 300 is controlled by operating system software which includes a file management system, such as a disk operating system, which is part of the operating system software. One example of an operating system software with its associated file management system software is the family of operating systems known as Windows™ from Microsoft Corporation of Redmond, Wash., and their associated file management systems. Another example of an operating system software with its associated file management system software is the Linux operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMS, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. For example, embodiments of the present invention may be applied to many different types of databases, systems and application programs. Moreover, features of one embodiment may be incorporated into other embodiments, even where those features are not described together in a single embodiment within the present document. Accordingly, the invention is described by the appended claims.

What is claimed is:

1. A method comprising:

presenting to a network manager, via a graphical user interface (GUI) of a network management system, information regarding a plurality of network devices managed by the network management system, wherein the plurality of network devices are associated with a private computer network and are logically interposed between client systems of the private computer network and an external computer network;

receiving, via the GUI, from the network manager information indicative of a first physical interface of a first network device of the plurality of network devices and a second physical interface of a second network device of the plurality of network devices that are to be normalized, wherein the first physical interface and the second physical interface have different physical attributes;

normalizing, by the network management system, the first physical interface and the second physical interface by creating a virtual interface to which both the first physical interface and the second physical interface correspond;

receiving, via the GUI, from the network manager information regarding a policy applicable to the virtual interface;

responsive to said receiving, creating or modifying, by the network management system, a first configuration file for the first network device while the first network device is in an offline state and creating or modifying a second configuration file for the second network device while the second network device is in the offline state, wherein one or more policies or rules contained within the first configuration file and the second configuration file are expressed in terms of the virtual interface; and applying policy configurations, by the network management system, to the first network device and the second network device and resolving physical interface configurations for the first physical interface and the second physical interface during installation of the first network device and the second network device by resolving references to the virtual interface in the first configuration file into the first physical interface and resolving references to the virtual interface in the second configuration file into the second physical interface.

2. The method of claim 1, further comprising:

creating a first policy group having a group policy applicable to all members of the first policy group;

adding the first network device and the second network device to the first policy group; and wherein said receiving, via the GUI, from the network manager information regarding a policy applicable to the virtual interface is responsive to said adding the first network device and the second network device to the first policy group.

3. The method of claim 1, wherein the first network device and the second network device comprise network security devices, web filters, spam firewalls, gateways, routers, load balancers or wireless devices.

4. The method of claim 3, wherein the first network device and the second network device comprise Unified Threat Management (UTM) devices.

5. The method of claim 1, wherein the plurality of network devices are of identical type.

6. A method comprising:

a step for presenting to a network manager, by a network management system, information regarding a plurality of network devices managed by the network management system, wherein the plurality of network devices are associated with a private computer network and are logically interposed between client systems of the private computer network and an external computer network;

a step for receiving, by the network management system, from the network manager information indicative of a first physical interface of a first network device of the plurality of network devices and a second physical interface of a second network device of the plurality of network devices that are to be normalized, wherein the first physical interface and the second physical interface have different physical attributes;

a step for normalizing, by the network management system, the first physical interface and the second physical interface to a common virtual interface;

a step for receiving, by the network management system, from the network manager information regarding a policy applicable to the virtual interface;

responsive to said step for receiving, a step for creating or modifying, by the network management system, a first configuration file for the first network device while the first network device is in an offline state and creating or modifying a second configuration file for the second network device while the second network device is in the offline state, wherein one or more policies or rules contained within the first configuration file and the second configuration file are expressed in terms of the virtual interface; and a step for applying policy configurations, by the network management system, to the first network device and the second network device and resolving physical interface configurations for the first physical interface and the second physical interface during installation of the first network device and the second network device by resolving references to the virtual interface in the first configuration file into the first physical interface and resolving references to the virtual interface in the second configuration file into the second physical interface.

7. The method of claim 6, further comprising:

a step for creating a first policy group having a group policy applicable to all members of the first policy group;

a step for adding the first network device and the second network device to the first policy group; and wherein said step for receiving is responsive to said step for adding the first network device and the second network device to the first policy group.

8. The method of claim 6, wherein the first network device and the second network device comprise network security devices, web filters, spam firewalls, gateways, routers, load balancers or wireless devices.

9. The method of claim 8, wherein the first network device and the second network device comprise Unified Threat Management (UTM) devices.

10. The method of claim 6, wherein the plurality of network devices are of identical type.

11. A non-transitory program storage device readable by a network management system, embodying a program of instructions executable by one or more processors of the network management system to perform a method of managing a plurality of network devices, wherein the plurality of network devices are associated with a private computer network and are logically interposed between client systems of the private computer network and an external computer network, said method comprising:
- presenting to a network manager, via a graphical user interface (GUI) of the network management system, information regarding the plurality of network devices;
- receiving, via the GUI, from the network manager information indicative of a first physical interface of a first network device of the plurality of network devices and a second physical interface of a second network device of the plurality of network devices that are to be normalized;
- normalizing, by the network management system, the first physical interface and the second physical interface by creating a virtual interface to which both the first physical interface and the second physical interface correspond;
- receiving, via the GUI, from the network manager information regarding a policy applicable to the virtual interface;
- responsive to said receiving, creating or modifying, by the network management system, a first configuration file for the first network device while the first network device is in an offline state and creating or modifying a second configuration file for the second network device while the second network device is in the offline state, wherein one or more policies or rules contained within the first configuration file and the second configuration file are expressed in terms of the virtual interface; and
- applying policy configurations, by the network management system, to the first network device and the second network device and resolving physical interface configurations for the first physical interface and the second physical interface during installation of the first network device and the second network device by resolving references to the virtual interface in the first configuration file into the first physical interface and resolving references to the virtual interface in the second configuration file into the second physical interface.

12. The non-transitory program storage device of claim 11, wherein the method further comprises:
- creating a first policy group having a group policy applicable to all members of the first policy group;
- adding the first network device and the second network device to the first policy group; and
- wherein said receiving, via the GUI, from the network manager information regarding a policy applicable to the virtual interface is responsive to said adding the first network device and the second network device to the first policy group.

13. The non-transitory program storage device of claim 11, wherein the first network device and the second network device comprise network security devices, web filters, spam firewalls, gateways, routers, load balancers or wireless devices.

14. The non-transitory program storage device of claim 13, wherein the first network device and the second network device comprise Unified Threat Management (UTM) devices.

15. The non-transitory program storage device of claim 11, wherein the plurality of network devices are of identical type.

* * * * *